J. M. HOYT & S. NUTTING.
Wheels for Vehicles.

No. 150,954.    Patented May 19, 1874.

Attest:—
C. Clarence Poole
E. M. Gallaher.

Inventors~
Jona. M. Hoyt
Stephen Nutting,
By their atty, R. D. O. Smith

AM. PHOTO-LITHOGRAPHIC Co. N.Y. (OSBORNE'S PROCESS.)

UNITED STATES PATENT OFFICE.

JONATHAN M. HOYT AND STEPHEN NUTTING, OF NEW HAVEN, VERMONT.

IMPROVEMENT IN WHEELS FOR VEHICLES.

Specification forming part of Letters Patent No. 150,954, dated May 19, 1874; application filed April 23, 1874.

*To all whom it may concern:*

Be it known that we, JONATHAN M. HOYT and STEPHEN NUTTING, of New Haven, in the county of Addison and State of Vermont, have invented a new and useful Improvement in Wheel-Hubs; and we do hereby declare the following to be a full, clear, and exact description of the same, reference being had to the accompanying drawings, in which—

Figure 1:
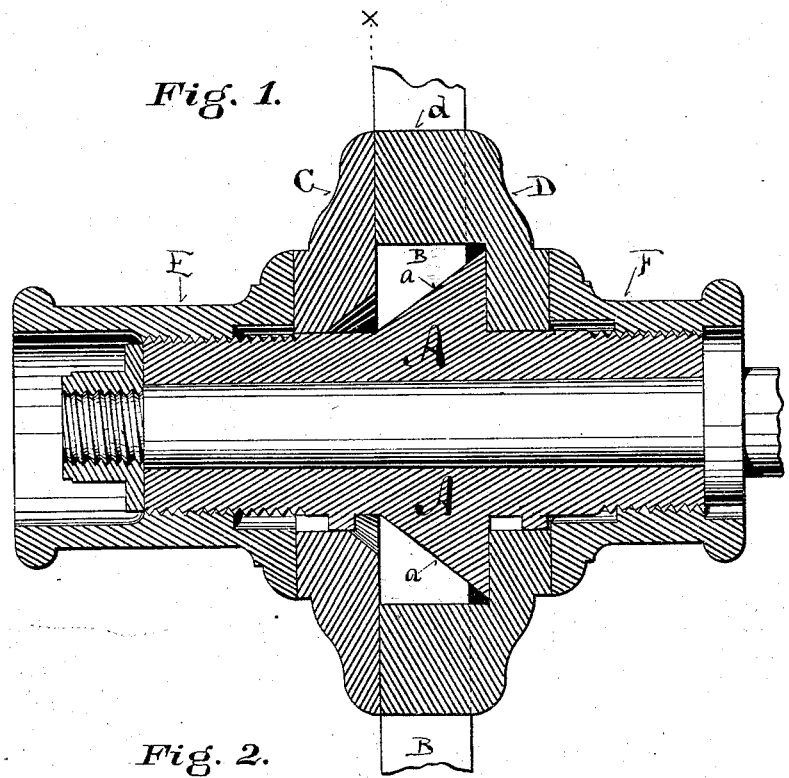
Figure 2:
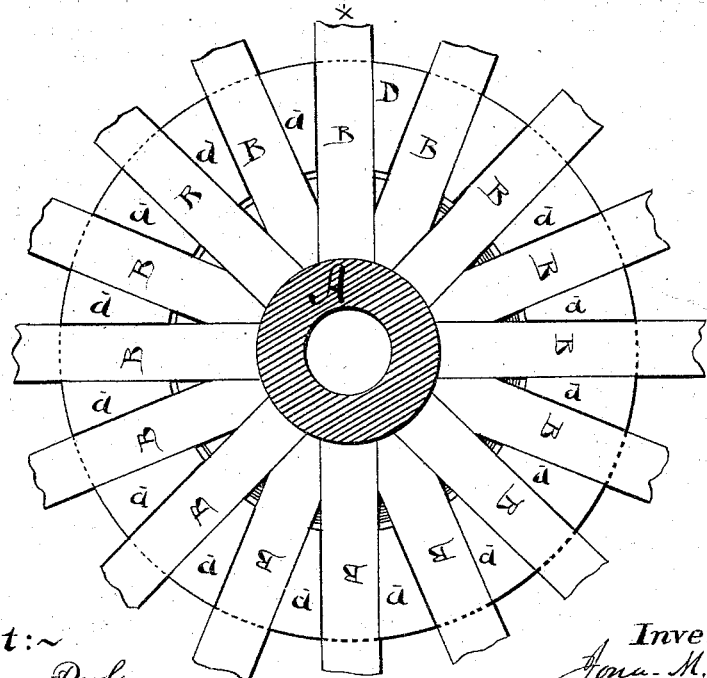

Figure 1 is a longitudinal central section. Fig. 2 is a cross-section of the same on line $x$ $x$ of Fig. 1.

This invention relates to that class of wheels known as expanding wheels, wherein devices are employed to expand the felly and thereby tighten the tire without removing and shrinking it; and it consists in making the hub with an inclined or oblique abutment, against which the spokes abut, and adjustable clamping collars or plates to clamp the spokes fast and adjust them at the proper point upon said oblique abutment, and shift said adjustment when necessary to force the spokes outward and expand the wheel.

That others may fully understand our improvement, we will particularly describe it.

We are aware that wheel-hubs have been made heretofore with devices whereby the spokes might be forced outward and the felly expanded; but, so far as known to us, such devices have consisted of adjustable wedges to force under said spokes, instead of making said wedge a part of the hub, and immovable as to it.

A is the hub, made preferably of cast-iron or other suitable material. About the central part of said hub there is the annular abutment $a$, with one of its surfaces or faces oblique to the axis of the hub, and its other face perpendicular thereto. The butts of the spokes B rest upon said oblique face of $a$, and are kept rigidly in place there by the clamping-plates C D, which are forced up against opposite sides of the spokes by the screw-sleeves E F, which travel upon screw-threads cut on the outer surface of the ends of the hub A. The plate D is constructed with projections $d$, which extend therefrom parallel with the axis of the hub and form sockets, within which the butts of the spokes rest, and by which they are kept in proper radial position. When the wheel is set up, the plate D is forced upon the hub until it is in contact with the perpendicular face of the abutment $a$. The spokes may then be put in place and clamped there by the plate C. When the tire, by long use, has become loose, the screw-sleeve F may be loosened and moved back a little, and then the sleeve E may be turned on, thus forcing the spokes up the oblique abutment $a$, and causing them at the same time to slip outward, so as to expand the felly and cause the same to expand and fill the tire tightly. The joints of the felly, which will be slightly opened by this process, may be made tight by wedging, or by some other convenient and proper means.

Having described our invention, what we claim as new is—

A hub having the annular, oblique-faced abutment $a$, combined with the clamping-plates C D and screw-sleeves E F, all to operate substantially in the manner set forth.

JONA. M. HOYT.
        STEPHEN NUTTING.

Witnesses:
  E. H. SQUIRE,
  HENRY O. GIFFORD.